April 24, 1934. A. J. DIESCHER 1,956,009
PIPE LINE SYSTEM FOR THE TRANSPORTATION OF NATURAL GAS
Filed Feb. 15, 1932
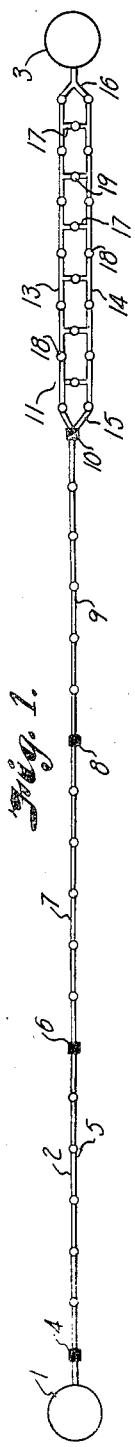
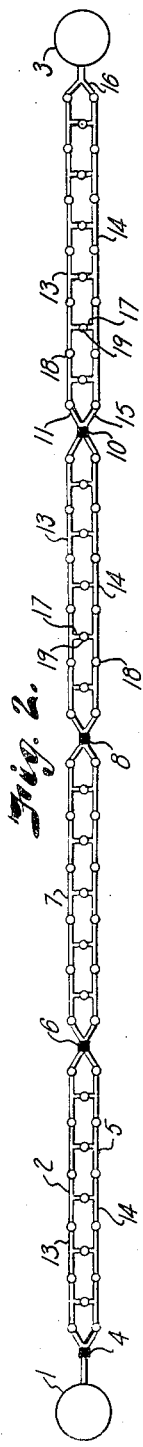
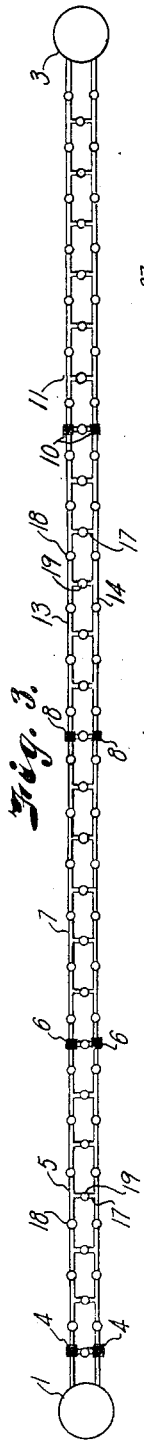
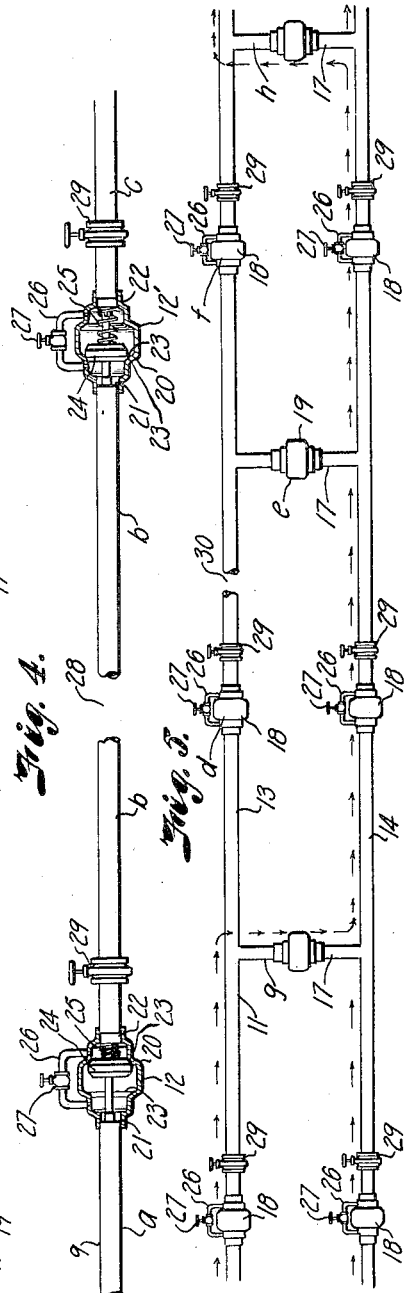
INVENTOR.
Alfred J. Diescher
BY
ATTORNEY.

Patented Apr. 24, 1934

1,956,009

UNITED STATES PATENT OFFICE 1,956,009

PIPE LINE SYSTEM FOR THE TRANSPORTATION OF NATURAL GAS

Alfred J. Diescher, Winfield, Kans., assignor of one-half to M. L. R. Diescher, Winfield, Kans.

Application February 15, 1932, Serial No. 592,939

7 Claims. (Cl. 48—190)

This invention relates to pipe line construction and more particularly to a pipe line system for the transportation of natural gas from the gas field to distant market sources.

In present gas transportation systems, particularly those serving large municipalities, it is difficult to maintain a constant supply of gas to meet the widely varying demands therefor; for example, the demand fluctuations during different periods of the day caused by the lighting of thousands of kitchen fires at meal time, shutting off of these fires between meal time, heavy drains caused by intermittent use of gas for industrial and heating purposes, and particularly the fluctuations caused by sudden climatic changes. It is apparent that sudden peak demands arise with little or no advance warning, and offer serious problems to the successful delivery of gas to the consumers, particularly where it must be transported for extremely long distances.

In short gas transportation lines the field may be depended upon to furnish a reserve supply in substantially meeting the requirements of a peak demand since the forecast of pending weather conditions and the like, together with the skill and experience of the operators, permit speeding up of the compressor stations to supply a greater amount of gas to take care of the demand about to occur, but in long lines, where the market is located at great distance from the source of supply, it takes days, rather than hours, to transport a new supply from the fields to the market. The advance warning, therefore, is not sufficiently ahead of the demand to permit delivery of the gas in time to supply the amount of gas required.

At the present time these peak demands are taken care of in part by ordering industrial plants and other large users of gas off the line in order to have a sufficient supply for domestic purposes until the supply can be supplemented from the field by a new supply of gas through speeding up of the compressors. Speeding up of the compressors adjacent the market offers very temporary relief, but this soon exhausts the supply of gas because it cannot be transported through the line fast enough to supply the speeded up compressors. Substantial relief must start with the compressors adjacent the field, which, as above pointed out, takes quite an interval of time to transport the new supply to the market.

Controlling the consumption of gas when the supply is short is very unsatisfactory even though the domestic users are satisfied, because the industrial plants suffer financial loss due to shutdowns and the pipe line company loses in the sale of gas in that it is not able to supply all that the market has demanded.

Breaks in the pipe line often occur and offer serious interruption to the service, as there is no protection to the gas consumers other than the amount of gas carried in the line ahead of the break (toward the market). The adequacy of the supply, of course, varies according to the distance that the break is from the market and the period of time required to make the repair. Of the breaks that are liable to occur in a gas pipe line, the most serious, therefore, is the one in the market leg of the line because the supply of gas in the uninterrupted part of the line is comparatively small and is soon exhausted.

Breakage of the pipe line also seriously interferes in the efficient operation of the compressor, because the compressor stations along the line must run at reduced capacity to pack the secure part of the line toward market until the break is repaired. After the break is repaird, the compressor stations must operate up to the limit of their capacity to try to catch up with the market demand.

In the gas industry, where the supply is transported some great distance, a line break is the greatest hazard of the business and is a constant dread to both the consumer and the operators of the line, because the breaks are more apt to occur at times of the greatest demand, when the operating pressures are at their highest and when the pipe lines are under greatest strain and stress from contraction due to blizzardly weather.

It has been apparent that storage facilities, whereby a reserve supply of gas may be built up during times of low consumption so that it could be used in cases of emergency, were desirable, but suitable holder storage such as used for storage manufactured gas is too costly and not economically practicable for storing large volumes of natural gas that are required to meet the peak demands and to furnish a gas supply in case of line breaks or station mishaps.

It is, therefore, the principal objects of my invention to provide a pipe line system having increased transport capacity and earning power, and whereby storage may be provided directly in the system to substantially eliminate interruptions to the gas service caused by line breaks and inadequate supply due to sudden peak demands caused by weather changes and the like, as above enumerated.

It is also a further object of the invention to provide a more secure operation of the line.

In accomplishing these and other objects of the invention, I have provided improved details of structure, the preferred forms of which are illustrated in the accompanying drawing, wherein:—

Fig. 1 is a diagrammatic view of a gas transportation system constructed in accordance with my invention, wherein a single line is employed in the station legs and a double line with cross-overs in the market leg.

Fig. 2 is a similar view of a gas transportation system embodying my invention employing double lines in all of the legs and common compressor stations.

Fig. 3 is a similar diagrammatic view of a further modified system employing double lines throughout its length and individual compressor stations for each of the lines, the lines being interconnected between the compressor stations by cross-over lines.

Fig. 4 is an enlarged sectional view of a portion of one of the station legs in the form shown in Fig. 1, illustrating the operation of the flow shut-off valves in case of a line break.

Fig. 5 is a similar view illustrating the by-pass of gas around a break in the market leg of the line illustrated in Fig. 1, or in any of the legs in the double lines illustrated in Figs. 2 and 3.

Referring more in detail to the drawing:—

The circle 1 designates a gas field, and 2 a pipe line for transporting the gas from the field to a distant market indicated by the circle 3.

Located adjacent the field is a field compressor station 4 for raising the field pressure of the gas to the desired amount, if field pressure is not ample of itself, for transportation through the first station leg 5 of the line to the first relay or booster station 6. From the booster station 6 the gas is compressed and discharged into the second leg 7 to the second relay station 8, where it is again compressed and discharged into the third station leg 9 of the line to the last relay station 10, which packs the gas into the market leg of the line 11.

There may be any number of relay stations located at desired intervals along the line to provide the desired propelling force for effecting transportation of the gas. The number of relay stations, of course, will vary with the length of the line and the compression ratios maintained.

Located in the station legs of the line at suitable intervals are a series of double acting check valves 12 which constitute an important feature of my invention, as later described.

The market leg 11 is of novel construction and also constitutes an important part of my invention, as it is especially constructed to provide storage facilities whereby the market may be supplied with an ample amount of gas during emergency periods until an increased supply of gas may be transported through the line from the field.

The market leg 11 consists of a plurality of parallel lines 13 and 14 connected at their ends adjacent the relay station 10 by Y branches 15 and at their ends adjacent the market by similar branches 16. The lines are connected at intervals throughout their length by cross-over lines 17, whereby gas may be diverted from one line to the other in case of a line break as later described, and to provide increased capacity for maintaining a reserve supply for use during peak demands.

The main lines 13 and 14 between the cross-over lines and the cross-over lines themselves are provided with double acting check valves 18 and 19, respectively, for controlling flow therethrough in the case of a break, as later described.

The double acting check valves may assume various constructions and specifically form no part of the present invention, but will constitute the subject matter of a separate application. Briefly the valves include a casing 20 having inlets 21 and outlets 22 provided with valve seats 23 adapted to be engaged by a double-faced reciprocatory valve 24 normally retained in central position between the respective seats by an expansion spring 25. As long as the pressures on the opposite sides of the valve are equal, flow will continue through the line, but should the pressure drop on one or the other sides of the valve, due for example to a line break, the reduction in pressure and sudden increased velocity of the flow will automatically effect closure of the valve against the seat, which is in the direction of the break, to interrupt the gas flow in the disrupted part of the line and to conserve the gas in the uninterrupted part of the line.

The valve housing is further provided with a by-pass 26 communicating with the ends of the housing on the exterior sides of the valve seats, whereby pressures may be equalized on opposite sides of the valve to permit return of the valve to its normal open position under influence of the spring 25, as later described, flow through the by-pass being controlled by a suitable hand valve 27.

Assuming that a break occurs in one of the single station legs of the line, as indicated at 28 (Fig. 4), at a point between a pair of the double acting check valves 12 and 12', as indicated, the gas will immediately rush from the break and reduce pressure in the disrupted part of the line. This reduction in pressure causes the gas in the section of the line indicated at "$a$" to rush through the valve housing 12 into the disrupted section "$b$". The increased velocity of the gas supplemented by the pressure acting against the face of the valve from the direction of the field automatically seats the valve against the seat 23 at the outlet side, shutting off flow into the disrupted section "$b$".

Likewise the pressure in the section "$c$" ahead of the disrupted section relieves itself by back flow through the break, similarly closing the valve in the casing 12', preventing further back flow from the section "$c$".

It is thus apparent that the compressor stations ahead of the section "$a$" may continue to operate to pack the gas in the line up to the closed valve 12. Likewise the compressors in the line toward market may continue drawing gas from the section "$c$" to pack the storage leg of the line from which the market may be supplied as when the line is under normal operation. As soon as the break is repaired, the by-pass valves 27 will be opened to allow pressures to equalize on opposite sides of the valves to permit the springs to return them to their normal position to allow flow through the line into the repaired section "$b$".

It is apparent that packing the gas in the section "$a$" increases the pressure therein, while the pressure drops in the section "$c$" due to the market draw during the repair period, and that the air or gas in the section "$b$" is substantially atmospheric pressure.

Pressure in the section "$c$" will, therefore, always be much lower than in the section "$a$", so that it is not possible to effect quick opening of the check valve ahead of the break because as the pressure in the section "b" increases by equalization efforts through the by-pass, the increasing pressure in the section "b" will act on the valve 12' to open it against the lower pressure in the section "c". This will prevent building up further pressure in the section "b" to equal the pressure in the section "a". Consequently, some mechanical means must be provided to unseat the valve 12 to permit continuation of the flow, or a suitable gate valve 29 may be inserted in the line, as is illustrated in the present instance. When the gate valve is closed and the by-pass valve opened, the pressure ahead of the gate valve will equalize to permit the spring to open the valve, after which the by-pass valve may be closed and the gate valve opened. However, the gate valve must be slowly opened to prevent the sudden rush of gas from again closing the check valve.

I have illustrated the gate valve as one method of effecting opening of the check valve. However, other methods may be employed and I do not wish to be limited to the specific construction employing a gate valve in connection with a double acting check valve.

It is obvious that the gas which has been packed in the section "a" may flow into the section "b" to help raise the pressure in the line toward the market which has dropped in pressure due to the draw therefrom while the break was being repaired.

Should a break occur in the market leg of the line, such as is indicated at 30 in Fig. 5, a sudden rush of gas from the break will effect closure of the double acting check valves "d", "e" and "f", so that the gas travelling through the line 13 will be diverted through the cross-over line "g" into the line 14 and around the break to the second cross-over line "h" where the flow may continue back to the line 13. Thus in this form of the invention the flow will continue regardless of the break which is limited only by the drop in pressure caused in shunting the gas around the section of the factured line. If the compressor stations are not working to full line load pressures, these cross-over lines will deliver the full market demand through the uninterrupted portion of the line without material increase in station pressure.

In the form illustrated in Fig. 2, a break occurring any place in the lines would not disrupt the service since the gas will be automatically diverted around the break through the cross-over lines, as previously described, in case of breakage in the market leg of the line illustrated in Figs. 1 and 5. The flow will be uninterrupted except for the added compression in the single line carrying the double line capacity around the break, or should some mishap occur to one of the stations along the line.

In the form illustrated in Fig. 3, where individual stations are provided for each of the lines, substantially continuous flow of gas can be maintained regardless of breaks in either one of the lines or breaking down of one of the stations, because the gas flowing through that station may be automatically diverted to the corresponding station in the other line by the automatic valves in the same manner as the gas is diverted around a break in one of the lines. In this form of the invention the pairs of stations in the respective lines are also connected by cross-overs having double acting valves similar to those in the intermediate cross-overs previously described.

From the foregoing it is apparent that with an automatically operating detouring system placed in the market leg of the line, substantially uninterrupted service is provided and the hazard of a pipe line break is substantially eliminated.

It is also apparent that the double line construction of the market leg greatly increases the storage capacity and provides reserve supply of gas from which the market may draw during times of peak demand without interfering with the service.

In the form illustrated in Figs. 2 and 3, full benefit of the system is obtained so that lines may continue to give uninterrupted service regardless of the place of a line break.

What I claim and desire to secure by Letters Patent is:

1. In a gas transportation system, spaced parallel trunk lines, stations located at intervals between said trunk lines, means connecting the trunk lines with said stations, cross-over lines connecting said trunk lines between said stations to supplement the storage capacity of said lines, automatic valves in each trunk line between said cross-over lines, and similar valves in said cross-overs whereby in case of a line break selective valves operate to divert gas from the broken line to the other line and around said break.

2. A pipe line for transporting gas from the field to a market including a plurality of compressor stations located at intervals between the field and the market, station legs connecting the stations, a market leg connecting the last station with the market including double trunk lines having cross-overs connecting said lines to provide a reserve storage at the market end of the line, and automatically operable means in said trunk and crossovers for diverting gas from either of said lines to the other through selected cross-over lines in case of a pressure drop in one of the lines.

3. In a gas transportation system, spaced parallel trunk lines, cross-over lines interconnecting said trunk lines arranged to maintain a reserve gas supply in said system, and automatic double acting check valves in each of said lines and cross-overs whereby a line break will effect automatic operation of certain of said valves to divert the gas around said break.

4. A gas transportation system, spaced parallel trunk lines, cross-over lines interconnecting said trunk lines to supplement storage capacity of the lines, automatic valves in the cross-over lines and in the trunk lines between the cross-over lines operable by sudden surge through the line caused by a line break to effect closure of the valves in the trunk line and cross-over line nearest the break to automatically divert the gas around said break.

5. In a gas transportation system, spaced parallel trunk lines, compressor stations in each of said lines, cross-over lines connecting the trunk lines at said stations, a series of cross-over lines interconnecting the trunk lines between said stations to supplement storage capacity of said lines, check valve means in the trunk lines between each of said cross-over lines, and check valve means in the cross-over lines cooperating with the check valve means in the trunk lines for automatically diverting gas through one of the cross-over lines to the other trunk line in case of a line break in one of the trunk lines.

6. In a pipe line for transporting gas to market, a trunk line including spaced parallel flow lines having substantially equal flow capacities, cross-over lines interconnecting said flow lines at spaced intervals along the length of said flow lines to maintain substantially equal pressure at corresponding points in said lines, double acting check valves in the flow lines between the cross-over lines, and double acting check valves in the cross-over lines for automatically cooperating with the first named check valves for diverting flow from one of the flow lines through one of the cross-over lines to the other flow line and to the next cross-over line in the direction of market for return to the first flow line when a break occurs in one of the lines to prevent flow through said break.

7. A pipe line for transporting gas from the field to a market including a plurality of compressor stations located at intervals between the field and the market, station legs connecting the stations, a market leg connecting the last station with the market including double trunk lines, a plurality of spaced cross-over lines connecting said trunk lines to provide a reserve storage at the market end of the line, automatic valves in said cross-over lines, and valves in each of the trunk lines between said cross-over lines for diverting gas from one of the trunk lines through one of the cross-over lines to the other trunk line and back to the first named trunk line in case of a line break in the first named trunk line to prevent flow of gas through the break.

ALFRED J. DIESCHER.